US008534621B1

(12) United States Patent
Anderson

(10) Patent No.: US 8,534,621 B1
(45) Date of Patent: Sep. 17, 2013

(54) LADDER HANGING ASSEMBLY AND METHOD

(76) Inventor: Paul W. Anderson, Moreno Valley, CA (US)

(*) Notice: Subject to any disclaimer, the term of this patent is extended or adjusted under 35 U.S.C. 154(b) by 707 days.

(21) Appl. No.: 12/607,914

(22) Filed: Oct. 28, 2009

Related U.S. Application Data

(60) Provisional application No. 61/109,255, filed on Oct. 29, 2008.

(51) Int. Cl.
*F16M 11/00* (2006.01)

(52) U.S. Cl.
USPC ........... 248/201; 248/210; 248/211; 248/304; 248/323; 248/339; 182/129; 211/115; 211/116

(58) Field of Classification Search
USPC ................. 248/210, 211, 304, 306, 307, 317, 248/323, 329, 332, 339, 690, 201, 274.1, 248/309.1, 691; 211/106.01, 113, 116, 115; 182/129
See application file for complete search history.

(56) References Cited

U.S. PATENT DOCUMENTS

| | | | | | |
|---|---|---|---|---|---|
| 5,460,280 | A * | 10/1995 | Feddeler | ....................... | 211/116 |
| 5,725,293 | A | 3/1998 | Wilkening et al. | | |
| 7,681,853 | B2 * | 3/2010 | Trusty et al. | .................. | 248/323 |
| 2005/0139559 | A1 * | 6/2005 | Trusty et al. | .................. | 211/113 |
| 2007/0256892 | A1 * | 11/2007 | Breedlove, Sr. | .............. | 182/116 |
| 2010/0108627 | A1 * | 5/2010 | Lupinacci et al. | ............ | 211/116 |

* cited by examiner

*Primary Examiner* — Todd M. Epps
(74) *Attorney, Agent, or Firm* — Knobbe, Martens, Olson & Bear, LLP

(57) ABSTRACT

An assembly for hanging ladders from surfaces such as ceilings and walls. The assembly includes a first ladder hanger that defines an aperture that receives a first end of the ladder and a second ladder hanger that receives a second end of the ladder. The second ladder hanger includes movable members that can be moved to permit the second end of the ladder to be stored in the storage space and can further retain the ladder in the storage space. In one implementation, rotating members are used to manipulate the ladder hanger into a storage configuration, in another implementation; pivoting members are used.

34 Claims, 12 Drawing Sheets

LADDER HANGING ASSEMBLY AND METHOD

CROSS-REFERENCE TO RELATED APPLICATIONS

This application claims the benefit of U.S. Provisional Application No. 61/109,255 filed on Oct. 29, 2008 entitled Tall Ladder Storage System and in the Applicant's name of Paul W. Anderson, which is hereby incorporated in its entirety by reference herein.

BACKGROUND OF THE INVENTION

1. Field of the Invention

The present invention relates to ladders and, in particular, concerns systems and methods for storing ladders adjacent the ceilings of rooms.

2. Description of the Related Art

Ladders come in all different shapes and sizes. Many home owners end up owning several ladders for use around the house. These can include step ladders, extension ladders and the like. Some business owners have multiple ladders of multiple different sizes. For example, painters and other construction workers may own multiple different ladders of different sizes for multiple different applications.

One difficulty with ladders is that they are often hard to store when not in use. Some ladders may be taller than the interior dimensions of a room requiring that the ladders be stored on the floor where they are often in the way or can be damaged. Various different systems have been developed for storing ladders on side walls or adjacent ceilings but, often, these systems are cumbersome to use which ultimately limits their use.

For example, hooks sized to receive the side rails of ladders that are adapted to be mounted to walls and ceilings are commonly sold. While these hooks are capable of storing a ladder adjacent a wall or ceiling, these hooks are often difficult for the average person to use. This problem is particularly apparent with hooks that are to be positioned adjacent ceilings. Because, the typical ceiling is higher than an average person can reach, to hang ladders from the hooks, the person is obligated to use a step stool or other device to hang the ladder which complicates the use of the hooks.

Various other hanging assemblies have been disclosed, yet each of these systems typically require the use of step stools or require significant user manipulation of the hanging assembly to store the ladders. Further, typical ladder hangers of the prior art generally attach to one of the rails of the ladder so that the ladder hangs perpendicularly downward from the ladder hanger. This results in the ladder occupying an increased amount of space which can be problematic with crowded storage spaces. As such, existing ladder storage systems and methods are often not popular due to their bulky and cumbersome nature.

Based on the foregoing, there is a need for a ladder hanger assembly and method that is easier to use and does not necessarily require the use of step stools, etc. and stores the ladders in a manner that provides more space.

SUMMARY OF THE INVENTION

The aforementioned needs are satisfied by the ladder hanger assembly of the present invention which, in one embodiment, comprises a first ladder hanger that defines an aperture into which a first end of a ladder can be positioned. In this embodiment, the assembly further includes a second ladder hanger that in a first orientation allows the ladder to be pivoted about the first ladder hanger between a stowed position and a released position. The second ladder hanger can also be manipulated into a second orientation, where the ladder is stored in the second ladder hanger and the first ladder hanger. Preferably, in one specific implementation, the second ladder hanger can be manipulated by a user without requiring the user to have a step stool or other similar device.

In another specific implementation, the ladder hanger assembly further includes a lifting mechanism that lifts one end of the ladder from the stowed position and the released position with the other end of the ladder being positioned in the first ladder hanger. In one specific embodiment, the lifting mechanism comprises a rope and hook assembly that couples to the ladder and is further coupled to either the second ladder hanger or a surface adjacent the second ladder hanger so that a user can raise the end of the ladder to the stowed position by pulling down the rope or can lower the end of the ladder to the release position by releasing the rope and allowing the rope to lower the end of the ladder.

In one implementation, the second ladder hanger comprises at least one rotatable member that can move between an open position and a closed position. In the open position, the second ladder hanger allows access by the ladder to a storage space. In the closed position, the second ladder hanger retains the ladder in the storage space. In one specific embodiment, the second ladder hanger has two rotatable members that extend vertically downward and have two support members that extend laterally inward when the two rotatable members are in the closed position. The two rotatable members are preferably spaced such that the two support members support the exterior rails of the ladder to secure the ladder in the storage space. Preferably, in one implementation, the two rotatable members have user portions that extend downward a distance sufficient to allow a user to easily turn the rotatable members between the open and closed position while standing on the floor.

In another implementation, the second ladder hanger has two pivoting members that are gravitationally biased into a closed position when the ladder is secured in the storage space. The pivoting members pivot away from the closed position when the outer rails of the ladder contact the pivoting members when the ladder is being raised towards the storage space. In this implementation, once the ladder is in the storage space, the pivoting members are gravitationally biased into the closed position to thereby secure the end of the ladder in the storage space.

From the foregoing, it will be appreciated that ladders can be stored more easily requiring less use of step stools and the like. In a number of these implementations, the ladders are stored so that the rails of the ladder are arranged so that each rail is facing the ceiling. More particularly, the ladder is stored in the hanger assembly so that the plane of the ladder is parallel to the plane of the ceiling so that the ladder does not hang downward into more usable storage space thereby preserving the more usable storable space for other use. Further, the ladder can be stored and retrieved in a simple fashion requiring less effort on the part of the user. These and other objects and advantages will become more apparent from the following description taken in conjunction with the accompanying drawings.

DETAILED DESCRIPTION OF THE PREFERRED EMBODIMENT

Figure 1:
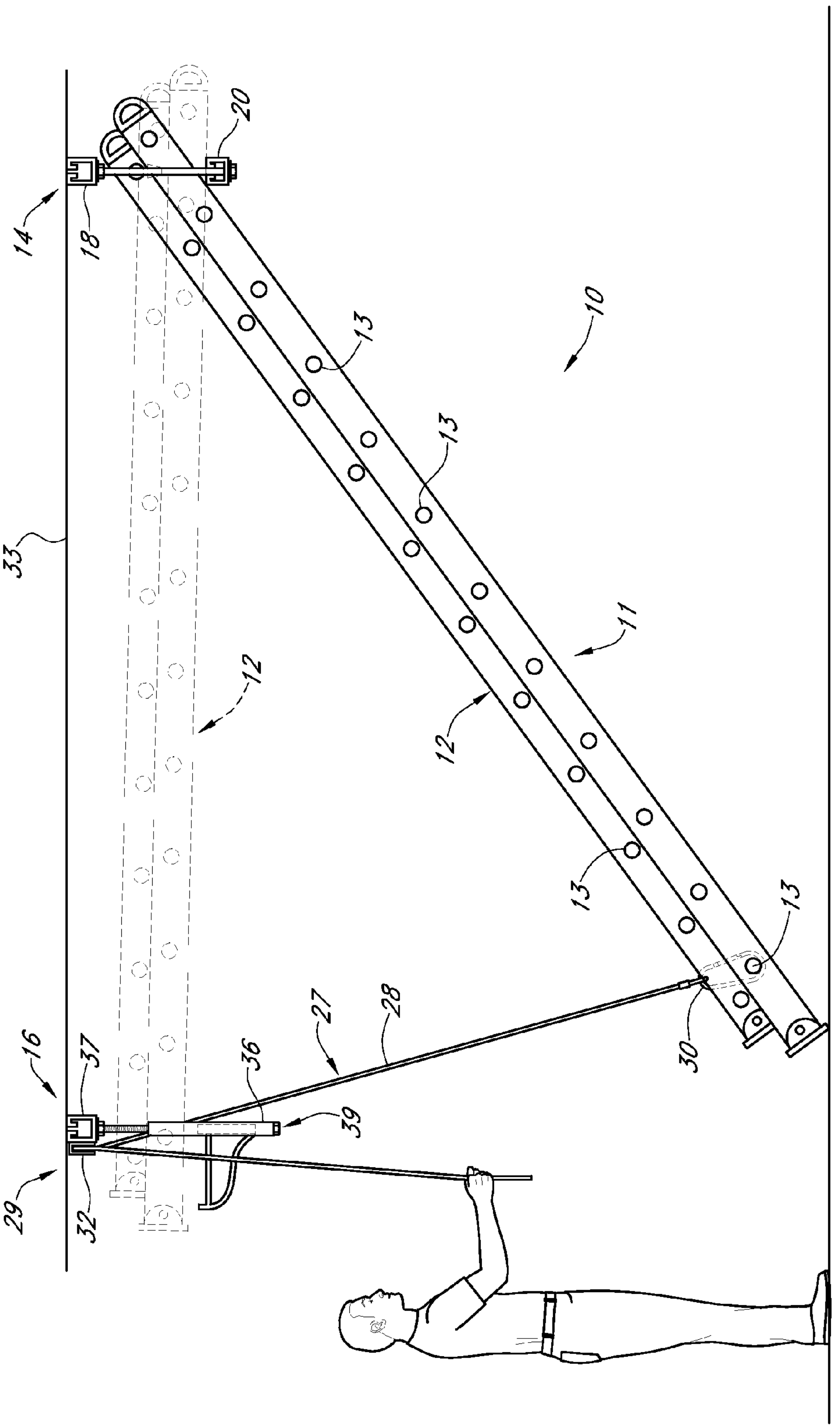
FIG. 1 is a side elevation view of one embodiment of a ladder storage assembly and method.

Reference will now be made to the drawings wherein like numerals refer to like parts throughout. Referring initially to FIGS. 1-5, a first embodiment of a ladder hanging assembly 10 and method of use thereof is illustrated. As shown in FIG. 1, the assembly 10 includes a first ladder hanger 14 that is mounted to the ceiling. The first ladder hanger 14 defines an aperture 15 (FIG. 3) that is sized so as to receive a ladder 11. The first ladder hanger 14 is generally fixed in that it defines an aperture that receives a first end of the ladder. As will be discussed in greater detail below, however, the first ladder hanger 14 is formed so as to be flexible to accommodate swaying motion, etc.

Figure 2:
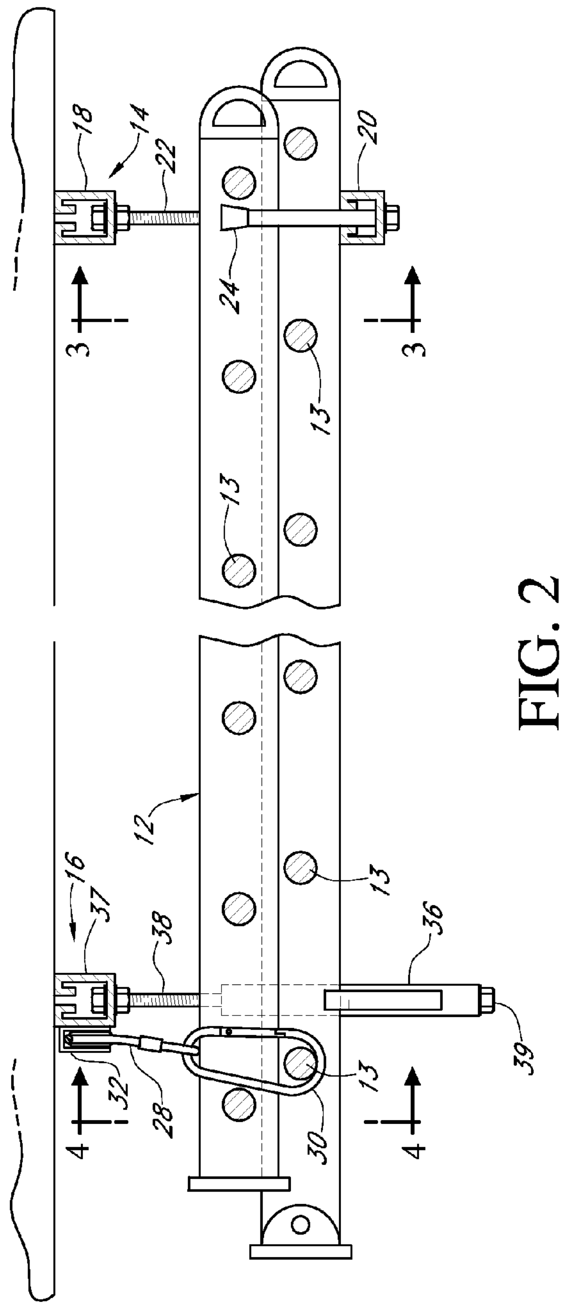
FIG. 2 is a detailed side elevation view of the embodiment of FIG. 1.

As is also shown in FIGS. 1 and 2, the assembly 10 also includes a second ladder hanger 16 that is generally movable between a open configuration and a closed configuration. In the open configuration, the second ladder hanger 16 allows for ladders to be positioned within or removed from a storage space defined by the second ladder hanger 16. In a closed configuration, the second ladder hanger 16 retains the second end of the ladder in the storage space to thereby store the ladder adjacent a surface such as the ceiling of a room or garage. As will be described in greater detail herein below, there are multiple different embodiments of the second ladder hanger 16 that allow for ladders to be selectively stowed or retrieved from the ladder hanger assembly 10.

As is also shown in FIGS. 1 and 2, the ladder hanger assembly 10 preferably includes a lifting mechanism 27 that allows a user to lift the second end of the ladder 11 upwards, with the first end of the ladder already positioned in the first ladder hanger 14. As is shown, the lifting mechanism 27 preferably includes a cord 28 and pulley system 29, that includes pulley wheels 34, 35 that are mounted adjacent the second ladder hanger 16 that allows the user to pull down on the cord 28 to raise the second end of the ladder 11 into the storage space of the second ladder hanger 16. In one implementation, the pulley wheels 34, 35 are mounted on a mounting member 37 of the second hanger 16 that is mounted to a surface, such as a ceiling 33 of the building, in which the ladder is being stored. As is illustrated, the cord 28 can be coupled to the ladder 11 via a hook that engages with a rung 13 of the ladder.

As will also be appreciated, the pulley system 29 may further include a catch mechanism that allows the user to set the pulley system 29 to retain the ladder in the storage location without the user exerting a downward force on the cord 28. Any of a number of well-known cord catch devices can be used to achieve this functionality without departing from the spirit of the present invention.

Figure 3:
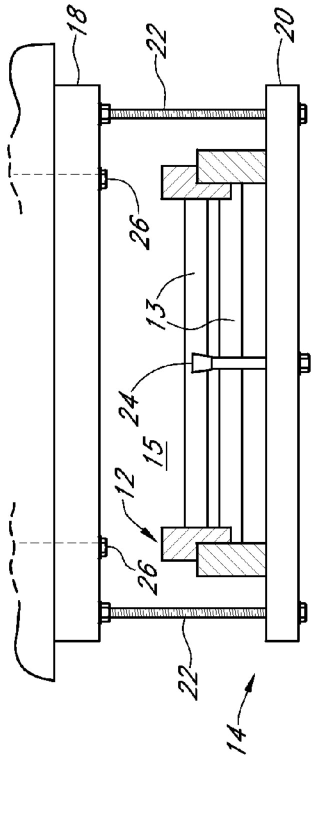
FIG. 3 is a first end view of the embodiment of FIG. 1.

Referring now to FIG. 3, the first ladder hanger 14 will now be described in greater detail. As shown, the first ladder hanger 14 includes a first mounting member 18 that is mounted to the ceiling 33 using fasteners 26 such as bolts, etc. Preferably, the first mounting member 18 is mounted so as to extend generally perpendicular to the length of the ladder so as to accommodate the ladder in the manner that will be described below. A pair of threaded rods 22 hang downward from the first mounting member 18 and are connected to a second horizontal member 20 so that the first mounting member 18, the second horizontal member 20 and the threaded rods 22 define the aperture 15 that is sized to receive the ladder 11. Preferably, the interconnection between the mounting member 18, the second member 20 and the threaded rods 22 is such that the members define the aperture 15 but are flexible with respect to each other to accommodate lateral movement of the ladder during storage and removal of the ladder 11. It will be appreciated that the first ladder hanger 14 can comprise any of a number of different configurations without departing from the spirit of the present invention, including standard hooks, etc. or even the second ladder hanger described below.

Figure 4:
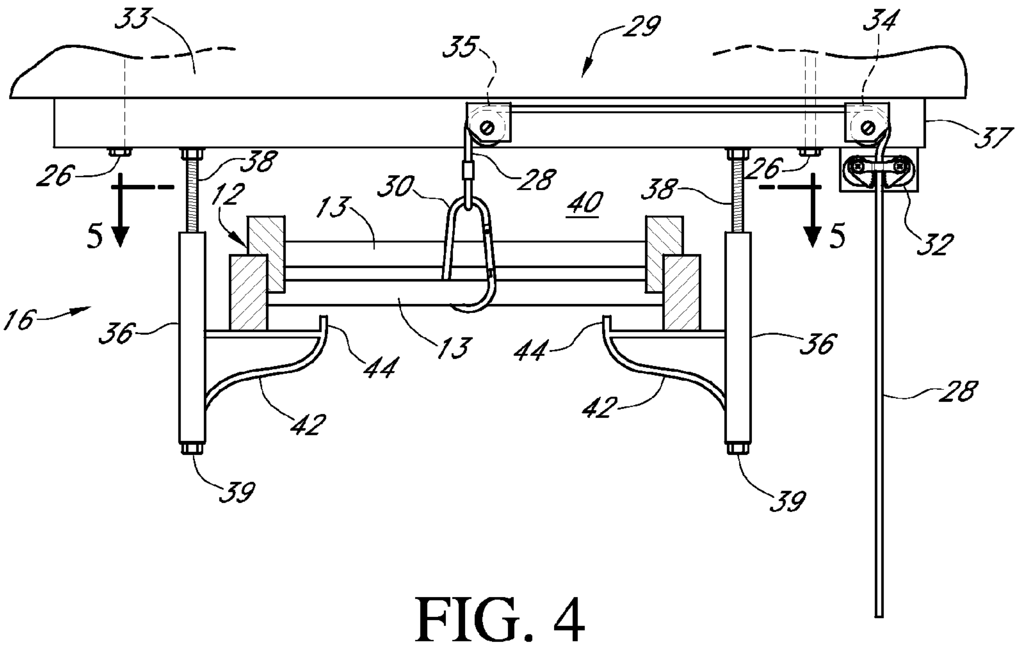
FIG. 4 is a second end view of the embodiment of FIG. 1.
Figure 5:
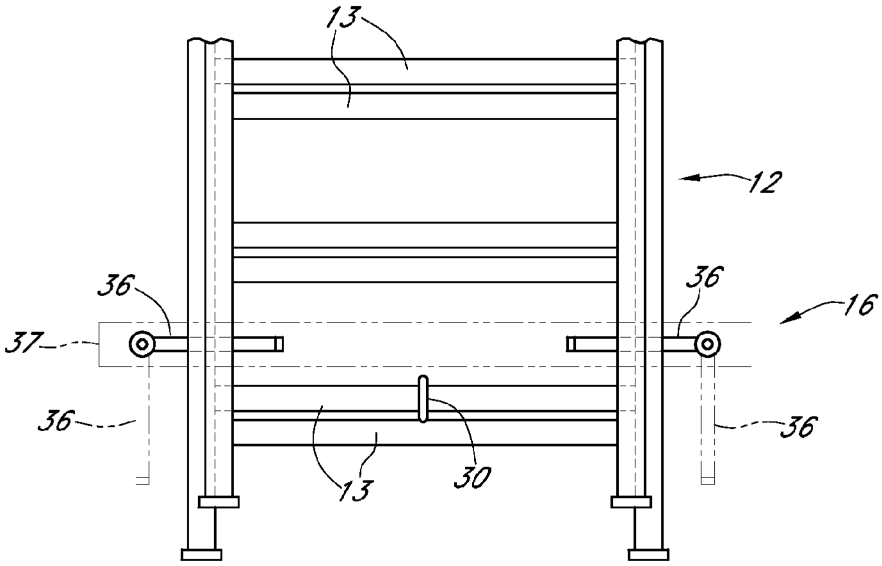
FIG. 5 is a top view of the embodiment of FIG. 1.

Referring now to FIGS. 4 and 5, the second ladder hanger 16 will now be described in greater detail. As shown, the second ladder hanger 16 includes a mounting member 37 that is mounted to the ceiling 33 in a direction that is substantially parallel to the direction of the mounting member 18 of the first ladder hanger 14. Two vertical members 38, that can be threaded members, are attached to the mounting member 37 so as to extend downward and two rotatable capture members 36 are then mounted to the vertical members 38 so as to be able to rotate between a closed position where the ladder 11 is retained in the second ladder hanger 16 and an open position (shown in dashed lines in FIG. 5) where the ladder 11 can be removed from second ladder hanger 16. The mounting member 37, the vertical members 38 and the capture members 36 all define a storage space 40 in which the second end of the ladder 11 can be stored.

The capture members 36 define inwardly extending support members 42 that extend inwardly into the storage space 40 a distance sufficient so that the rails 12 of the ladder 11 are positioned on the support members 42 when the capture members 36 are rotated into their closed position. A lip 44 may optionally be formed on an inner surface of the support members 42 so as to further help retain the second end of the ladder 11 in the storage space 40.

As is also shown in FIG. 4, the pulley assembly 29 can include multiple pulley wheels 34, 35 mounted on the mounting member 37 so that the cord can be removed from the path of the ladder during storage and removal of the ladder from storage. Further, a cord capture device 32 can also be used to lock the ladder into the storage space prior to the user pivoting the capture members 36.

When the user wishes to store the ladder 11 in the assembly shown in FIGS. 1-4, the user inserts a first end of the ladder 11 into the aperture 15 defined by the first ladder hanger 14 in the manner shown in FIG. 1. The user then couples a hook 30 to a rung of the ladder on the second end of the ladder 11 and then pulls down on the lifting assembly 27. This causes the ladder 11 to pivot with respect to the first ladder hanger 14 positioning the second end of the ladder in the storage space 40 defined by the second ladder hanger 16. When storing the ladder 11, the user preferably positions the capture members 36 into the open position. Subsequently, when the ladder 11 is lifted into the storage space 40, the user then turns the capture members 36 into the closed position thereby storing the ladder adjacent the ceiling 33.

When the user wishes to remove the ladder 11 from the assembly 10, the user raises the ladder off of the support members 42 using the lifting mechanism 27, rotates the capture members 36 into the open position and then proceeds to lower the second end of the ladder downward. Once the second end has been pivoted downward to a height where it is easier for the user to move the ladder, the user disconnects the hook and pulls the ladder out of the first ladder hanger 14.

It will be appreciated that the length of the capture members 36 has preferably been selected so that a user can reach the capture members 36 while standing on the floor. For higher ceilings, this may be achieved by attaching vertical extensions onto the capture member 36.

Figure 6A:
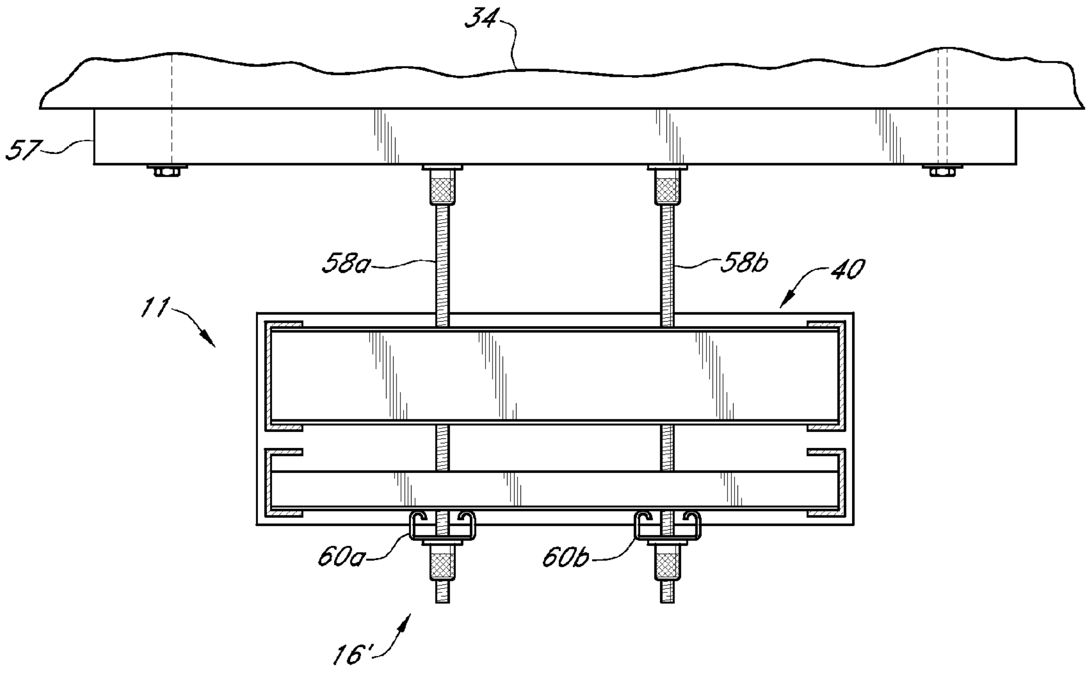
FIG. 6A is an end view of another embodiment of a ladder storage assembly and method.
Figure 6B:
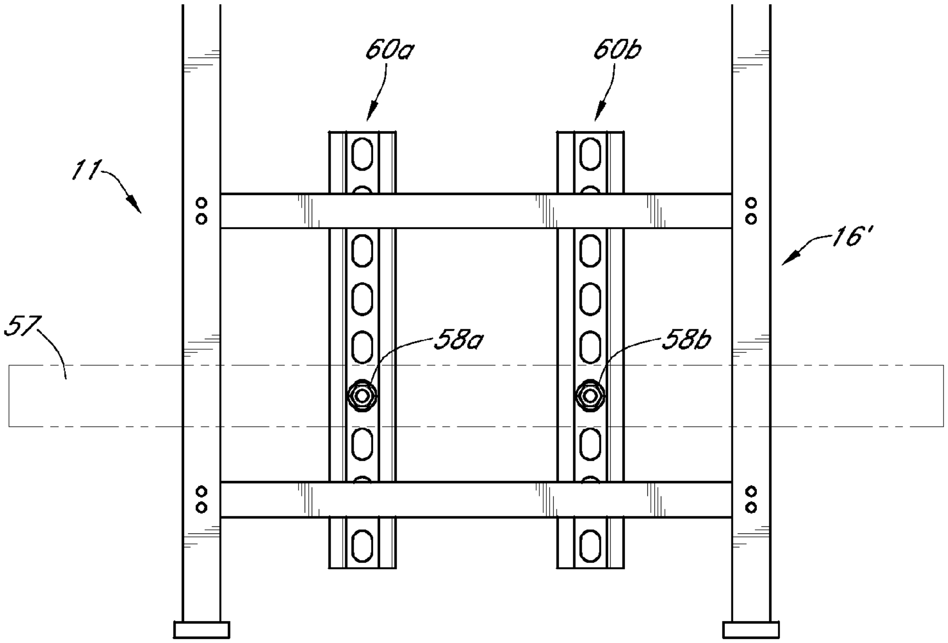
FIG. 6B is a bottom view of the assembly of FIG. 6A in closed position.
Figure 6C:
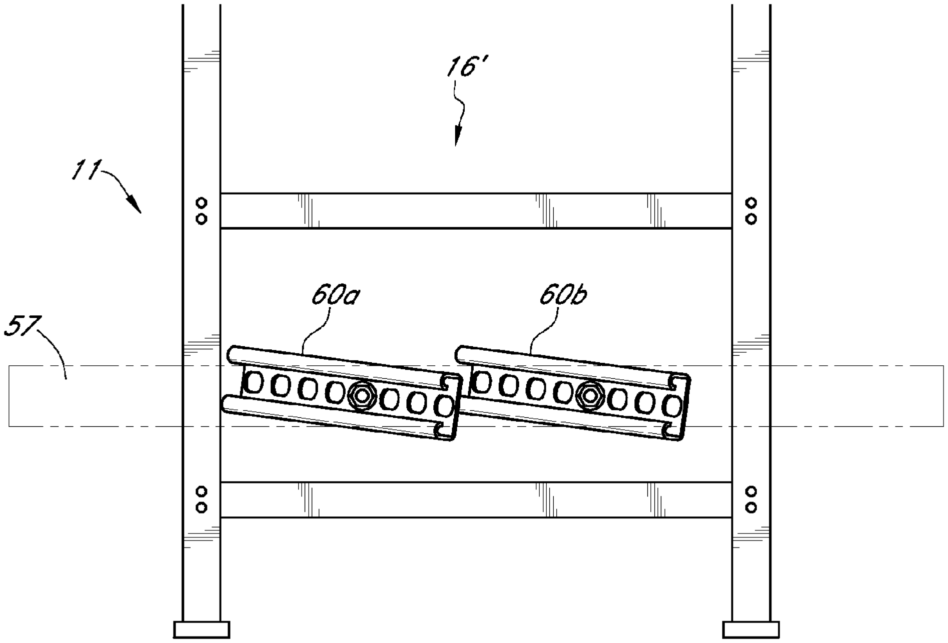
FIG. 6C is a bottom view of the assembly of FIG. 6A in an open position.

In some implementations, the second ladder hanger may be located at a height that is easy for a user to reach without requiring such an extension. The embodiments shown in FIGS. 6A-6C illustrate an alternative embodiment of the second ladder hanger 16' that can be used in that circumstance. In the embodiment of FIGS. 6A-6C, the second ladder hanger 16' comprises a mounting bracket 57 that is mounted to the ceiling 33 in the same manner as described above. Two vertically extending members 58*a*, 58*b* are mounted to the mounting bracket 57 so as to extend downward. Two rotatable capture members 60*a*, 60*b* are then mounted to the vertically extending members 58*a*, 58*b* so as to be rotatable between an open position and a closed position in the manners shown in FIGS. 6B and 6C.

As is illustrated, the difference between the embodiment of FIGS. 6A-6C and the embodiment of FIGS. 1-5, is that the capture members 60*a*, 60*b* are mounted so as to be inward of the outer rails 12 of the ladder 11 so as to engage with the rungs 13 to retain the second end of the ladder 11 in the storage space 40 of the second ladder hanger 16'. Further, the capture members 60*a*, 60*b* do not extend vertically downward as much as the capture members 36 in the embodiment of FIGS. 1-5 which makes the embodiment of FIGS. 6A-6C better suited for applications where the ceiling is lower or access is otherwise easier. Further, this embodiment may be optionally fitted with the lifting mechanism of FIGS. 1-5 or not depending upon the application.

FIGS. 7A-7F illustrate yet another embodiment of a second ladder hanger 16". In this embodiment, the ladder hanger 16" is self-actuating so that the user simply has to raise and lower the ladder 11 via the lifting mechanism 27 which is substantially the same as that described previously to store and remove the ladder. In this implementation, the second ladder hanger 16" has a mounting member 67 that is adapted to mount to the ceiling 33 in the same manner as described before. In this implementation, the ladder hanger 16" includes two pivoting vertical support members 76*a*, 76*b* that are pivotally attached to the mounting member 67. The force of gravity biases the pivoting support members 76*a*, 76*b* to hang vertically downward, but, as will be described below, the force of the ladder 11 on the members 76*a*, 76*b* allows the pivoting members 76*a*, 76*b* to be displaced laterally to store and remove the ladder from the storage space 40 defined by the pivoting members 76*a*, 76*b*.

As is also shown, the pivoting members 76*a*, 76*b* include laterally extending support members 78*a*, 78*b* with a lip 80*a*, 80*b* that extend inward into the storage space 40 to receive the rails 12 of the ladder 11. The pivoting members 76*a*, 76*b* further include an angled engagement member 82*a*, 82*b* located below the support member 78*a*, 78*b* that is shaped so as to facilitate lateral displacement of the pivoting members 76*a*, 76*b* as the ladder is being raised up into the storage space 40 in the manner that will be described herein below. The angled engagement members 82*a*, 82*b* are shown has having a flat portion adjacent the very bottom of the pivoting member 76*a*, 76*b*. It will be appreciated from the following discussion that the angled engagement members 82*a*, 82*b* simply have to be angled to facilitate movement of the pivoting members 76*a*, 76*b* in response to contact by the ladder and that the angled engagement members 82*a*, 82*b* may not necessarily have the flat portion and may form a triangular shape without departing from the spirit of the present invention.

As is also shown, a toggle member 86*a*, 86*b* is pivotally attached to the pivoting members 76*a*, 76*b* so as to overlie the support member 78*a*, 78*b* and so as to rest on the lips 80*a*, 80*b*. A tip 88*a*, 88*b* of the toggle members 86*a*, 86*b* extends beyond the lip 80*a*, 80*b* of the support members 78*a*, 78*b* so as to engage with the rails 12 of the ladder 11 when the ladder 11 is being stored in the storage space 40 in the manner that will be described in greater detail below.

Figure 7A:
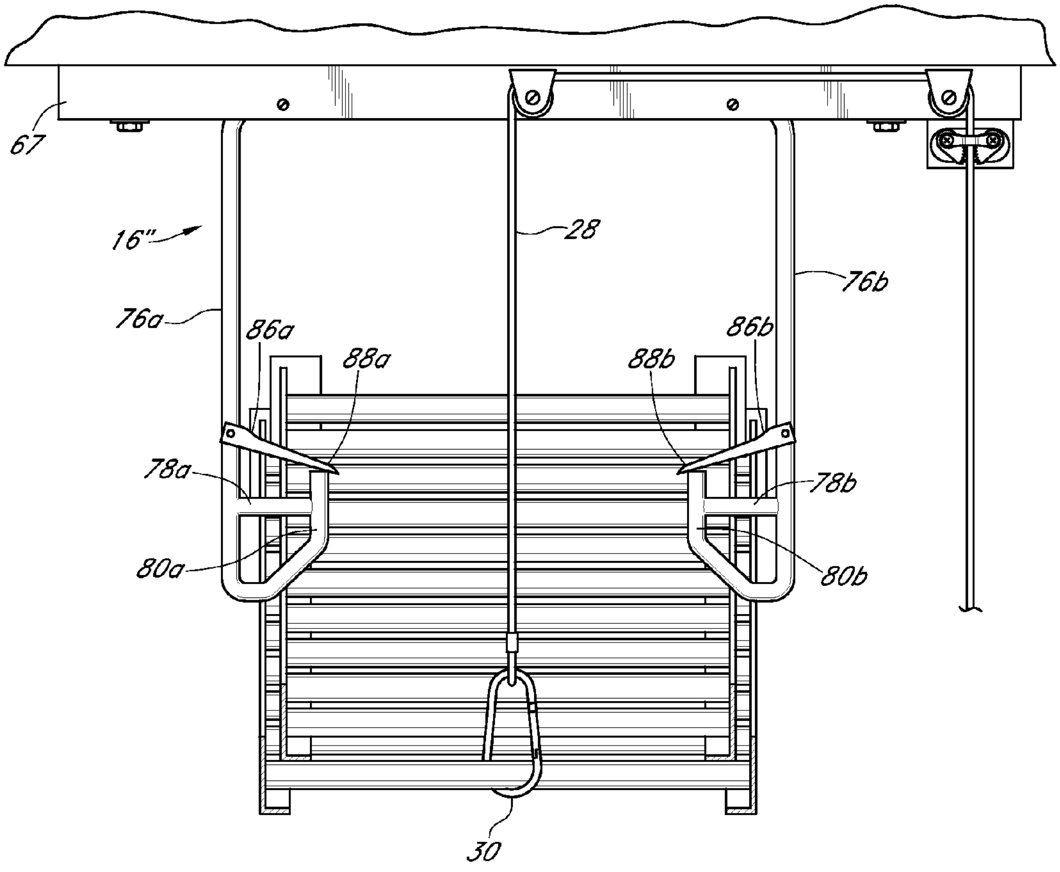
FIG. 7A is an end view of another embodiment of a ladder storage assembly and method.
Figure 7B:
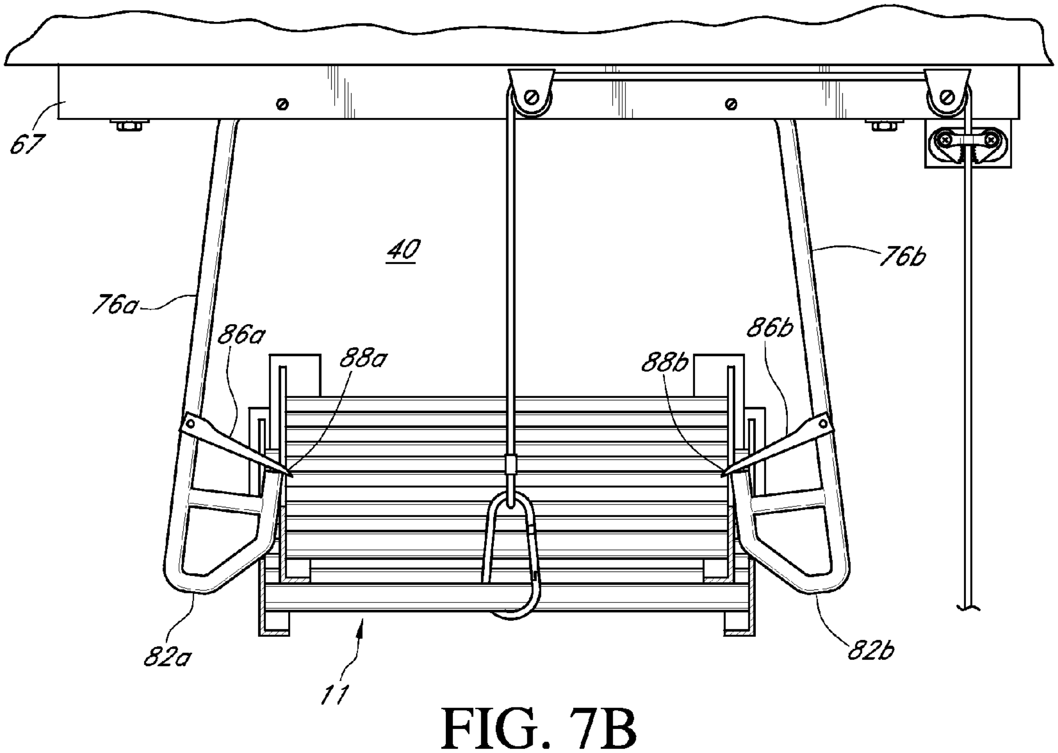
FIG. 7B is an end view of the embodiment of FIG. 7A illustrating the ladder being moved from a released position to a stored configuration.

The operation of the second ladder hanger 16" will now be described in connection with FIGS. 7A-7C. As shown, the lifting mechanism 27 is coupled to a rung 13 of the ladder 11 in same manner as described above and the ladder 11 is lifted towards the storage space 40. As shown in FIG. 7B, as the ladder rails 12 engage with the angled engagement members 82*a*, 82*b*, the pivoting members 76*a*, 76*b* pivot outward allowing the ladder 11 to be lifted into the storage space 40.

Figure 7C:
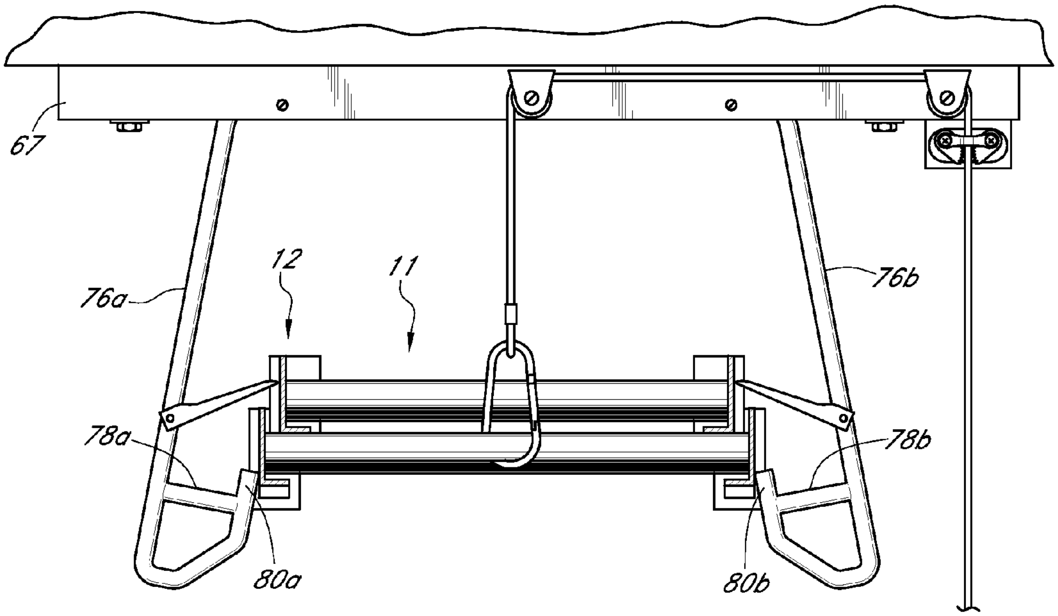
FIG. 7C is an end view of the embodiment of FIG. 7A illustrating the ladder in a stored configuration.

As the ladder is lifted further, the rails 12 engage with the tips 88*a*, 88*b* of the toggle members 86*a*, 86*b* urging the toggle members 86*a*, 86*b* to pivot upwards in the manner shown in FIG. 7C. Once the ladder 11 has been lifted past the point where the rails engage with the lip 80*a*, 80*b* of the support members 78*a*, 78*b*, the pivoting members 76*a*, 76*b* pivot under the force of gravity into a vertical orientation in the manner shown in FIG. 7D. The upward movement of the ladder 11 continues to displace the toggle members 86*a*, 86*b* in the manner shown in FIG. 7D to thereby allow the rails 12 to rest on the lateral support members 78*a*, 78*b*.

Figure 7D:
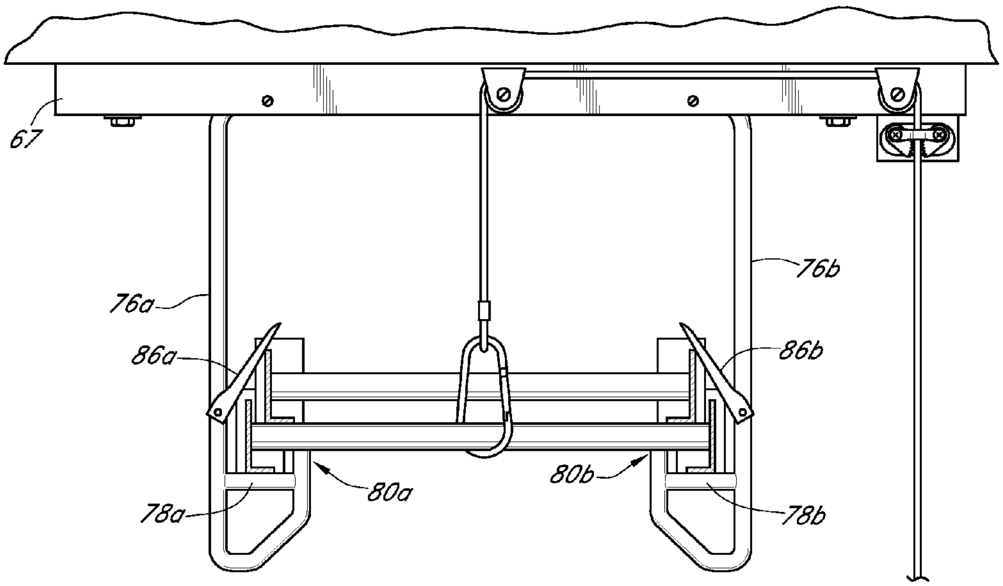
FIG. 7D is an end view of the embodiment of FIG. 7A illustrating the ladder being removed from a stored configuration to a released configuration.
Figure 7E:
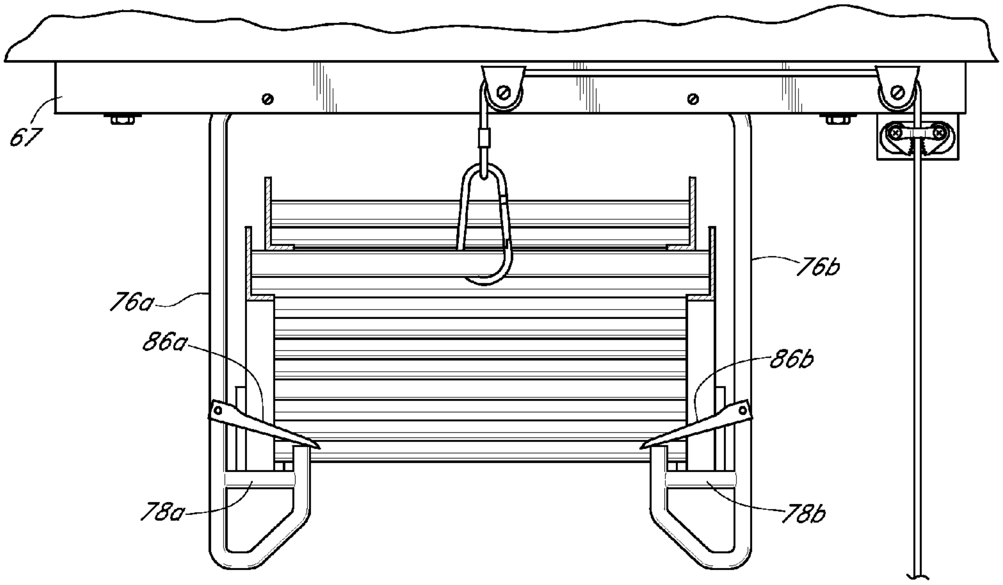
FIG. 7E is an end view of the embodiment of FIG. 7A illustrating the ladder being removed from a stored configuration to a released configuration.
Figure 7F:
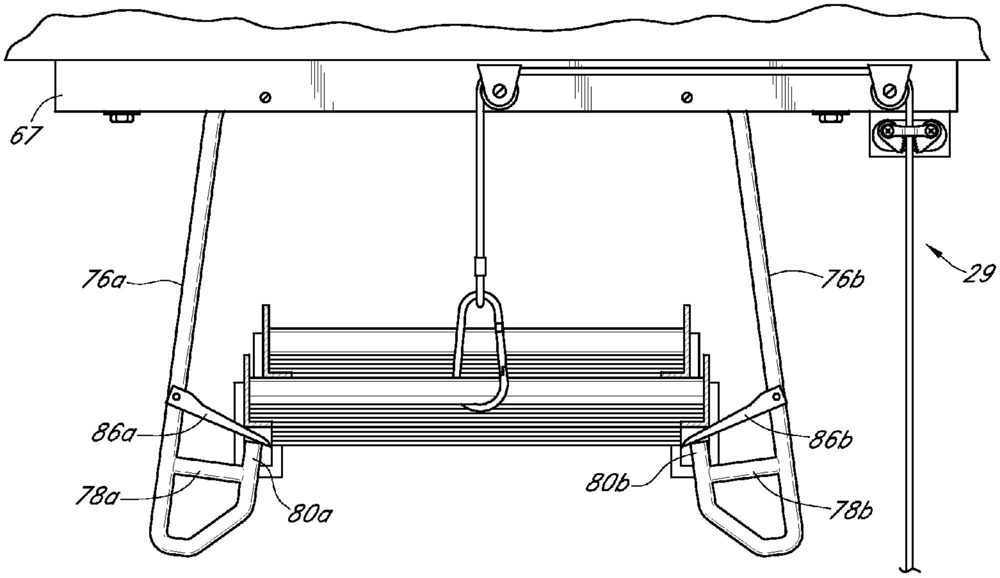
FIG. 7F is an end view of the embodiment of FIG. 7A illustrating the ladder being removed from a stored configuration to a released configuration.

Thus, in FIG. 7D, the ladder 11 is shown in its stowed or stored configuration. To remove the ladder from this configuration, the user has to lift the ladder 11 using the lifting assembly 27 to the point where the ladder is lifted upwards of the toggle members 86*a*, 86*b* at which point the toggle members 86*a*, 86*b* rotate downward into engagement with the lips 80*a*, 80*b* of the lateral support members 78*a*, 78*b* in the manner shown in FIG. 7E.

Once this occurs, the ladder 11 can then be lowered. As the rails 12 of the ladder 11 become engaged with the toggle member 86*a*, 86*b*, the toggle member 86*a*, 86*b* is angled thereby causing the pivoting members 76*a*, 76*b* to pivot outward in the manner shown in FIG. 7F to thereby allow the ladder 11 to be released from the storage space 40. The second end of the ladder 11 can then be lowered from the second ladder hanger 16" and removed from the first ladder hanger 14 in the same manner as described before.

The second ladder hanger 16" thereby allows a user to store and remove an end of the ladder by simply lifting the ladder up or down with the lifting mechanism 27 and does not require further manipulation of the ladder hanger to secure or release the ladder. It will be appreciated that while this embodiment has shown the ladder hanger 16" as being used with the lifting mechanism 27, it will be appreciated that the user may place the ladder into the storage space 40 of the second ladder hanger 16" without using the lifting mechanism without departing from the scope of teachings of the present invention.

Figure 7G:
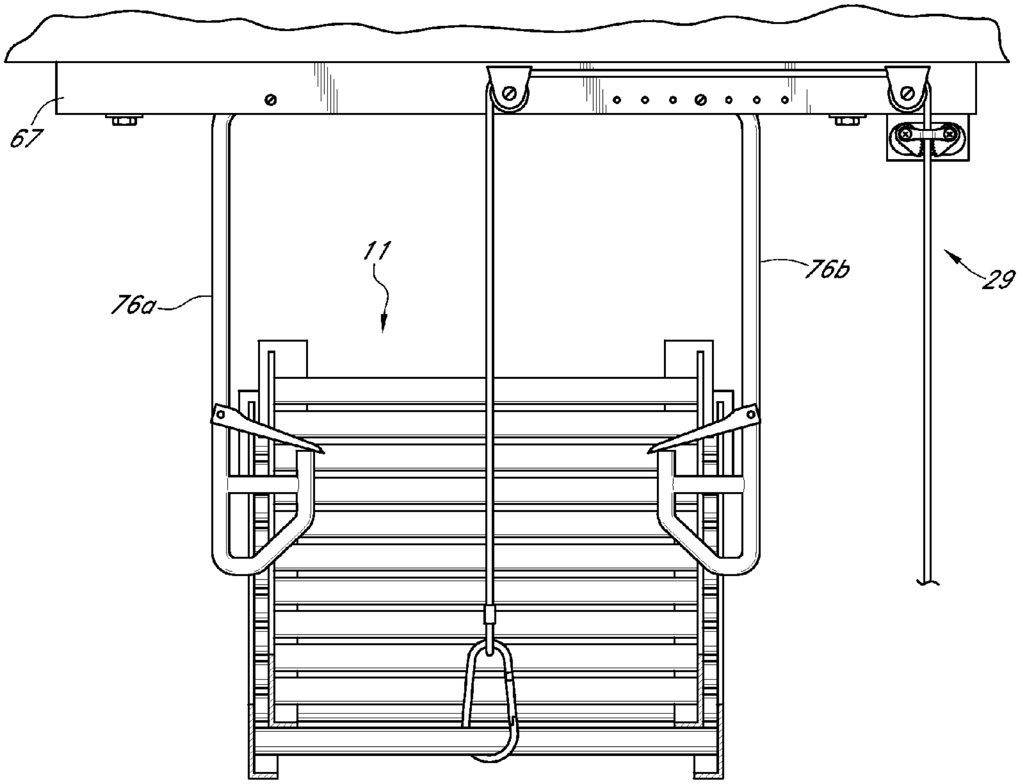
FIG. 7G is an end view of an embodiment similar to the embodiment of FIG. 7A incorporating a first adjustable mechanism to accommodate ladders of different sizes.
Figure 7H:
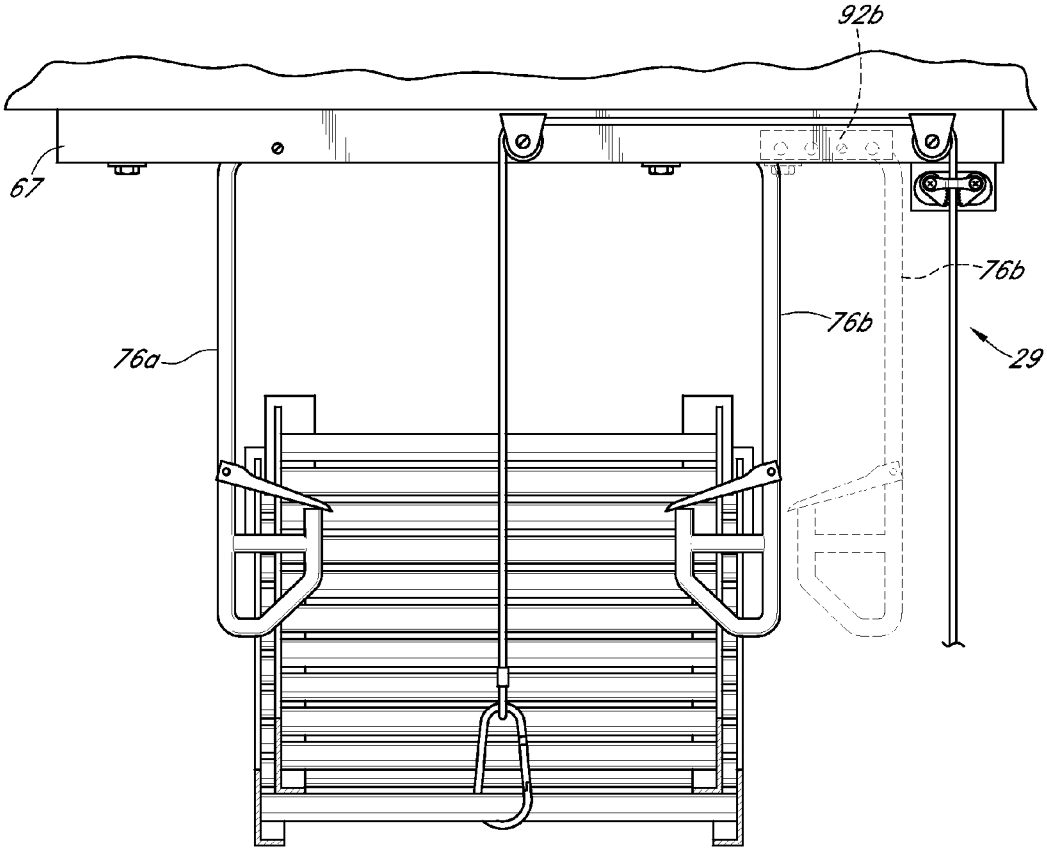
FIG. 7H is an end view of an embodiment similar to the embodiment of FIG. 7A incorporating a second adjustable mechanism to accommodate ladders of different widths.

FIGS. 7G and 7H illustrates another embodiment of the second ladder hanger 16". It will be appreciated that the pivoting members 76*a*, 76*b* have to be positioned at the right distance apart to accommodate a specific ladder width. In this embodiment, there are a number of possible different mechanisms for allowing the pivoting members 76*a*, 76*b* to be positioned to accommodate different ladder widths. In one embodiment, holes 90 are formed in the upper mounting member 67 at pre-selected intervals in the manner shown in FIG. 7G. The pivoting members 76*a*, 76*b* can be pivotally connected to the member 67 at a plurality of different locations to accommodate different widths of ladders.

Figure 8:
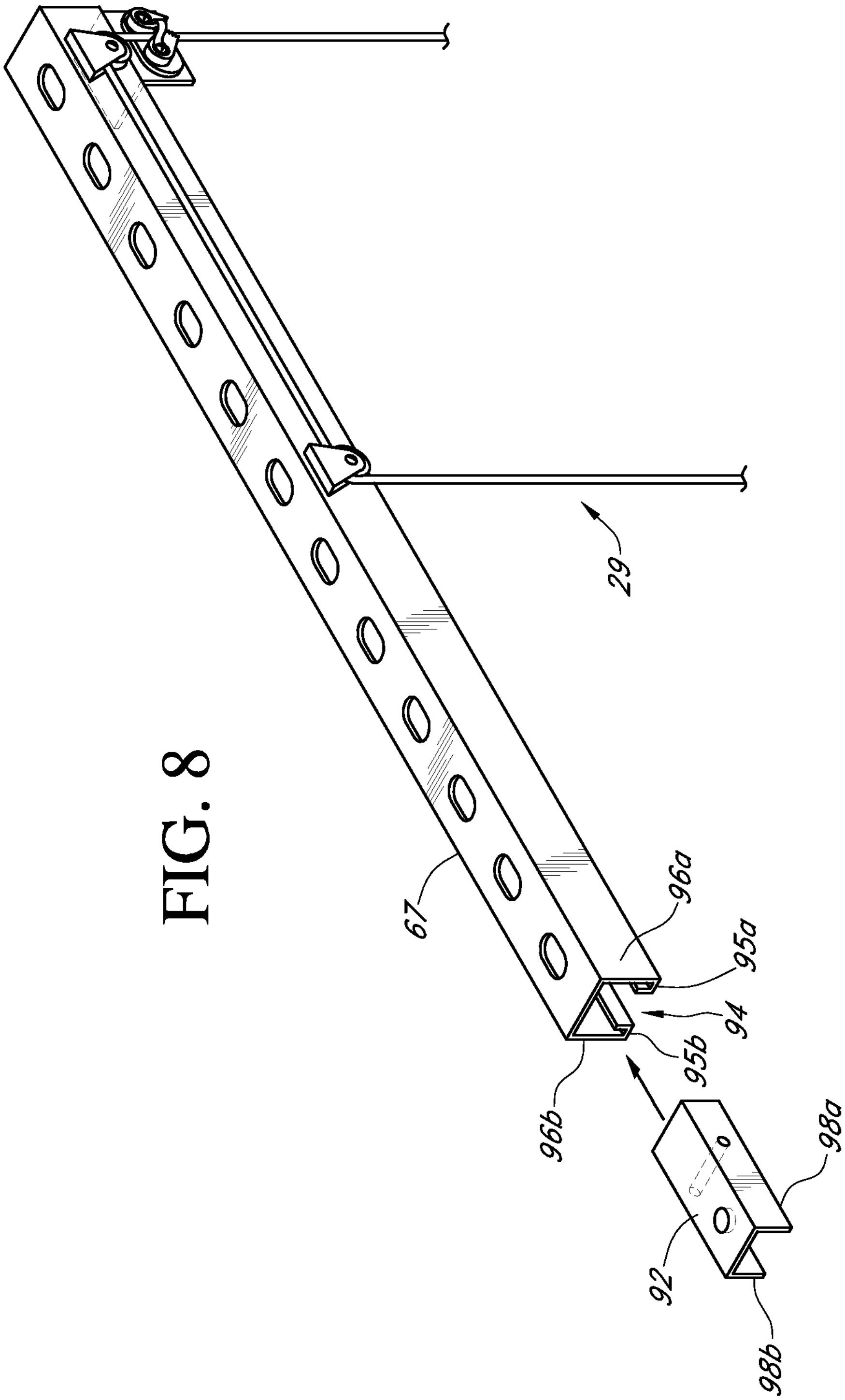
FIG. 8 is a partial perspective view of the embodiment shown in FIG. 7H.

In another embodiment shown in FIGS. 7H and 8, the pivoting member 76*a*, 76*b* can be respectively attached to sliding members 92*a*, 92*b* that are positioned within the mounting member 67. In one specific implementation, the mounting member 67 defines an inverted C-channel 94 with a lip 95*a*, 95*b* and the end of the legs 96*a*, 96*b* of the C-channel. The sliding members 92*a*, 92*b* also have legs 98*a*, 98*b* that are preferably slidably engaged with the lips 95*a*, 95*b* so as to be movable along the C-channel. The pivoting members 76*a*, 76*b* can then be slid inward or outward to accommodate different widths of ladders. Preferably, in one implementation, frictional engagement between the sliding members 92*a*, 92*b* is sufficient to retain the pivoting members 76*a*, 76*b* at the desired location.

It will be appreciated that various modifications, substitutions and changes to the form of the present invention may be made by those skilled in the art without departing from the scope of the present invention. Hence, the scope of the present invention should not be limited to the form of the invention described and illustrated herein but should be defined by the appended claims.

What is claimed is:

1. A ladder hanger assembly comprising:

a first ladder hanger that is mounted adjacent a surface that defines a space that receives a first end of a ladder and retains the first end adjacent the surface wherein the first ladder hanger comprises a frame with a mounting bracket that is adapted to be mounted to a ceiling and two vertical members that extend outwardly from the mounting bracket and a support bracket that interconnects the vertical members distally from the mounting bracket wherein the frame defines a partially enclosed space that is sized to receive the first end of the ladder so that rails of the ladder are substantially co-planar arranged in a plane parallel to the ceiling; and a second ladder hanger that is mounted adjacent the surface that defines a storage space that receives a second end of the ladder wherein the second ladder hanger has at least one movable member that is movable between an open configuration and a closed configuration so that the ladder can be moved into or out of the storage space in the open configuration and retained in the storage space when the at least one movable member is in the closed configuration; and a lifting mechanism that allows a user to lift the second end of the ladder into and out of the storage space defined by the second ladder hanger.

2. The assembly of claim 1, wherein the lifting mechanism comprises a cord having a hook that can hook onto a rung of the ladder and a pulley system mounted adjacent the storage space that allows the user to lift and lower the second end of the ladder into and out of the storage space defined by the second ladder hanger.

3. The assembly of claim 1, wherein the second ladder hanger includes a mounting member that attaches the second ladder hanger to a surface and wherein the at least one movable member that is movable between an open position that allows the second end of the ladder to be positioned in and removed from the storage space defined by the second ladder hanger and a closed position that retains the second end of the ladder in the storage space.

4. The assembly of claim 3, wherein the at least one movable member comprises two movable members that are rotatable members that have support surfaces that extend inward into the storage space in the closed position to provide a surface to support a portion of the second end of the ladder in the storage space.

5. The assembly of claim 4, wherein the movable members are spaced so as to engage rungs of the second end of the ladder in the closed positioned and wherein the support surfaces are sized so that in the open position, the support surfaces are smaller than the opening between the rails of the ladder thereby allowing the second end of the ladder to be removed from the storage space.

6. The assembly of claim 4, wherein the movable members are spaced so as to engage the rails of the second end of the ladder in the closed position and wherein the movable members move to an open position where the support surfaces do not intersect the rails of the ladder.

7. The assembly of claim 6, wherein the mounting member is mounted to a ceiling and the movable members include an extension that extends downwardly a distance sufficient to allow a user to grasp the extension and move the movable member between the open and closed position while standing on the ground.

8. The assembly of claim 4, wherein the rotatable members are movable with respect to each other to accommodate different widths of ladders.

9. The assembly of claim 8, wherein the mounting member includes a plurality of mounting holes to permit the rotatable members to be mounted over a range of positions with respect to each other.

10. The assembly of claim 8, further comprising sliding members that are slidably mounted with respect to the mounting member and wherein the rotatable members are respectively coupled to the sliding members to permit the rotatable members to be positioned over a range of positions with respect to each other.

11. The assembly of claim 1, wherein the at least one movable member has a support surface that is mounted to the mounting member so as to pivot with respect to the mounting member in response to the second end of the ladder engaging the at least one movable member to thereby allow access to the storage space and wherein the at least one movable member is gravitationally biased into a closed position where the support surface is positioned so as to support and retain the second end of the ladder in the storage space.

12. The assembly of claim 11, wherein the at least one movable member comprises two movable members and both of the two movable members comprise a vertically extending member having a support surface wherein the vertically extending member is mounted to the mounting member so as to pivot with respect to the mounting member in response to the second end of the ladder engaging the at least one movable member.

13. The assembly of claim 12, wherein the at least two movable members each further include a toggle member that is pivotally attached to the movable member so that when the second end of the ladder is moved into the storage space, the toggle member is moved by the second end of the ladder to allow the ladder to be positioned on the support surface.

14. The assembly of claim 13, wherein the toggle members are further configured so that when a user lifts the second end of the ladder off of the support surfaces to remove the ladder out of the storage space, the toggle members move to inhibit the ladder from contacting the support surface and so that the ladder engages with the toggle members to induce the movable members to pivot outward thereby allowing the second end of the ladder to be lowered out of the storage space for removal of the ladder.

15. A ladder hanger assembly comprising:

a first ladder hanger that is mounted adjacent a surface that defines a space that receives a first end of a ladder and retains the first end adjacent the surface; and a second ladder hanger that is mounted adjacent the surface that defines a storage space that receives a second end of the ladder wherein the second ladder hanger has at least two movable members that are movable between an open configuration and a closed configuration so that the ladder can be moved into or out of the storage space in the open configuration and retained in the storage space when the two movable members are in the closed configuration wherein the second ladder hanger includes a mounting member that attaches the second ladder hanger to a surface and the at least two movable members that are movable between an open position that allows the second end of the ladder to be positioned in and removed from the storage space defined by the second ladder hanger and a closed position that retains the second end of the ladder in the storage space, wherein the two movable members comprise rotatable members that have support surfaces that extend inward into the storage space in the closed position to provide a surface to support a portion of the second end of the ladder in the storage space; and a lifting mechanism that allows a user to lift the second end of the ladder into and out of the storage space defined by the second ladder hanger.

16. The assembly of claim 15, wherein the lifting mechanism comprises a cord having a hook that can hook onto a rung of the ladder and a pulley system mounted adjacent the storage space that allows the user to lift and lower the second end of the ladder into and out of the storage space defined by the second ladder hanger.

17. The assembly of claim 15, wherein the first ladder hanger comprises a frame that is adapted to be mounted to a ceiling that defines a partially enclosed space that is sized to receive the first end of the ladder so that the rails of the ladder are substantially co-planar arranged in a plane parallel to the ceiling.

18. The assembly of claim 15, wherein the second ladder hanger includes a mounting member that attaches the second ladder hanger to a surface and the two movable members that is movable between the open position that allows the second end of the ladder to be positioned in and removed from the storage space defined by the second ladder hanger and the closed position that retains the second end of the ladder in the storage space.

19. The assembly of claim 15, wherein the two movable members are spaced so as to engage the rails of the second end of the ladder in the closed position and wherein the two movable members move to the open position where the support surfaces do not intersect the rails of the ladder.

20. The assembly of claim 19, wherein the mounting member is mounted to a ceiling and the two movable members include an extension that extends downwardly a distance sufficient to allow a user to grasp the extension and move the two movable members between the open and closed position while standing on the ground.

21. The assembly of claim 15, wherein the two movable members has a support surface that is mounted to the mounting member so as to pivot with respect to the mounting member in response to the second end of the ladder engaging the two movable members to thereby allow access to the storage space and wherein the two movable members is gravitationally biased into a closed position where the support surface is positioned so as to support and retain the second end of the ladder in the storage space.

22. The assembly of claim 21, wherein the two movable members each comprises a vertically extending member having a support surface wherein the vertically extending member is mounted to the mounting member so as to pivot with respect to the mounting member in response to the second end of the ladder engaging the two movable members.

23. The assembly of claim 22, wherein the two movable members each further include a toggle member that is pivotally attached to the movable member so that when the second end of the ladder is moved into the storage space, the toggle member is moved by the second end of the ladder to allow the ladder to be positioned on the support surface.

24. The assembly of claim 23, wherein the toggle members are further configured so that when a user lifts the second end of the ladder off of the support surfaces to remove the ladder out of the storage space, the toggle members move to inhibit the ladder from contacting the support surface and so that the ladder engages with the toggle members to induce the two movable members to pivot outward thereby allowing the second end of the ladder to be lowered out of the storage space for removal of the ladder.

25. The assembly of claim 24, wherein the two movable members are movable with respect to each other to accommodate different widths of ladders.

26. A ladder hanger assembly comprising:

a first ladder hanger that is mounted adjacent a surface that defines a space that receives a first end of a ladder and retains the first end adjacent the surface; and a second ladder hanger that is mounted adjacent the surface that defines a storage space that receives a second end of the ladder wherein the second ladder hanger has at least one movable member that is movable between an open configuration and a closed configuration so that the ladder can be moved into or out of the storage space in the open configuration and retained in the storage space when the at least one movable member is in the closed configuration wherein the at least one movable member has a support surface that is mounted to the mounting member so as to pivot with respect to the mounting member in response to the second end of the ladder engaging the at least one movable member to thereby allow access to the storage space and wherein the at least one movable member is gravitationally biased into a closed position where the support surface is positioned so as to support and retain the second end of the ladder in the storage space; and a lifting mechanism that allows a user to lift the second end of the ladder into and out of the storage space defined by the second ladder hanger.

27. The assembly of claim 26, wherein the lifting mechanism comprises a cord having a hook that can hook onto a rung of the ladder and a pulley system mounted adjacent the storage space that allows the user to lift and lower the second end of the ladder into and out of the storage space defined by the second ladder hanger.

28. The assembly of claim 26, wherein the second ladder hanger includes a mounting member that attaches the second ladder hanger to a surface and the at least one movable member that is movable between an open position that allows the second end of the ladder to be positioned in and removed from the storage space defined by the second ladder hanger and the closed position that retains the second end of the ladder in the storage space.

29. The assembly of claim 26, further comprising sliding members that are slidably mounted with respect to the mounting member and wherein the movable members are respectively coupled to the sliding members to permit the movable members to be positioned over a range of positions with respect to each other.

30. The assembly of claim 26, wherein the at least one movable member comprises two movable members and both of the two movable members comprise a vertically extending member having a support surface wherein the vertically extending member is mounted to the mounting member so as to pivot with respect to the mounting member in response to the second end of the ladder engaging the at least one movable member.

31. The assembly of claim 30, wherein the at least two movable members each further include a toggle member that is pivotally attached to the movable member so that when the second end of the ladder is moved into the storage space, the toggle member is moved by the second end of the ladder to allow the ladder to be positioned on the support surface.

32. The assembly of claim 31, wherein the toggle members are further configured so that when a user lifts the second end of the ladder off of the support surfaces to remove the ladder out of the storage space, the toggle members move to inhibit the ladder from contacting the support surface and so that the ladder engages with the toggle members to induce the movable members to pivot outward thereby allowing the second end of the ladder to be lowered out of the storage space for removal of the ladder.

33. The assembly of claim 32, wherein the movable members are movable with respect to each other to accommodate different widths of ladders.

34. The assembly of claim 33, wherein the mounting member includes a plurality of mounting holes to permit the movable members to be mounted over a range of positions with respect to each other.

* * * * *